United States Patent Office 3,471,251
Patented Oct. 7, 1969

3,471,251
PROCESS FOR THE PREPARATION OF
AMMONIUM BROMIDE
Aleksander Szczodry, W. Spokajna 3, Zabrze, Poland
No Drawing. Filed Oct. 12, 1966, Ser. No. 586,043
Claims priority, application Poland, Oct. 14, 1965,
P 111,212
Int. Cl. C01c 1/16
U.S. Cl. 23—100     2 Claims

ABSTRACT OF THE DISCLOSURE

Ammonium bromide is prepared from ammonia and bromine in the presence of ammonium salts of weak or intermediate acids as reducing agents.

---

The known processes for the preparation of ammonium bromide by use of iron as a reducing agent consist in the intermediate preparation of ferrous or ferric bromide which is subsequently converted to ammonium bromide by the action of ammonia and separation of insoluble iron hydroxide, or by the action of ammonium compounds, e.g. ammonium sulphate and the separation of ammonium bromide by sublimation, particularly in a jet of carrier gas. A modification of this process consists in the submission of an iron bromide solution to the action of milk lime, separation of iron hydroxide and ammonium carbonate treatment of the produced calcium carbonate solution, separation of calcium carbonate and crystallisation of ammonium bromide by evaporation of the solution.

In using iron as a reducing agent there are produced sparingly soluble by-products of iron compounds, which occlude a portion of the obtained ammonium bromide, whereby they reduce the efficiency of the raw material.

It is also known that the ammonia can reduce bromine in accordance with the reaction formula:

$$8NH_3 + 3Br_2 \rightleftharpoons 6NH_4Br + N_2 \qquad (1)$$

This reaction occurs in an exceptionally violent manner with the explosive liberation of gases and the production of a dense white fog of ammonium bromide. In spite of the great danger in performing this process, it has been used in commercial scale, where, in order to avoid excessive losses there is a significant dilution of ammonia necessary and a very slow introduction of bromine, in consequence of which the efficiency of process is very low.

In order to increase the efficiency, heretofore one used carbon compounds derived from methane as the reducing agents, such as formic acid and its salts, the involving of course, an additional expense of the raw material. The economic advantages of the process according to reaction (1) prompted investigations on novel methods for the safe performance of this process. The known methods aiming to this effect consist in lowering of bromine reactivity by fast cooling of its mixture with water or by binding bromine into a complex with ammonium bromide.

Although this practice presents an important technical advance, it is not without an essential imperfection, consisting in the fact that in the solution there appears a great excess of bromine, which in consequence of the high vapor pressure is carried away by the rising gases. Further, there is the necessity of removal of a great excess of heat, which involves an additional increase in costs. The excess bromine presents a threat of explosion by the consequent production of explosive bromine compounds and nitrogen.

A condition favorable to the rise of explosive nitrogen and bromine compounds is not to maintain in the solution a constant, low concentration of free ammonia, because bromine is sparingly soluble in water, whereby the reaction always occurs, at least partially, at the interphase of the bromine-aqueous solution, in consequence of which, on this interphase there appears a layer of liquid, in which there is no free ammonia. The employed processes for introducing ammonia do not even enable the maintenance of a constant concentration of ammonia in the remaining solution beyond the interphase layer, because at the point of ammonia inlet its concentration is high, while at the interphase of the bromine-aqueous solution, ammonia amounts to zero. The mechanical or spontaneous stirring, which occurs as a result of liberation of gaseous nitrogen, does not help to improve the conditions of reaction and, on the contrary, enables the contact of bromine with the solution layers of high ammonia concentration, whereby the reaction occurs unequally with local superheating.

The process according to the invention prevents the side reactions, which involve the formation of explosive nitrogen compounds by securing constant, insignificant concentration of free ammonia uniformly in the whole volume of solution. This is obtained by use of ammonium salts of weak or intermediate acids as reducing agent. The maintenance of homogeneous concentration of free ammonia by use of the process, according to the invention, results from the hydrolytic equilibrium in accordance with the equations:

$$NH_4X + H_2O \rightleftharpoons NH_4OH + HX \qquad (2)$$
$$NH_4OH \rightleftharpoons NH_3 + H_2O \qquad (3)$$

which in summary is:

$$NH_4X \rightleftharpoons NH_3 + HX \qquad (4)$$

An important factor in the process according to this invention is the unexpected result that the minimum concentration of free ammonia, resulting from the equilibrium of hydrolytic ammonium salts of weak or intermediate acids, is sufficient for the reduction of bromine, and that the speed of this reduction is slower than the speed of ammonium salts hydrolysis, whereas it was heretofore known that the concentration of free ammonia resulting from the hydrolysis of ammonium salts of strong acids, e.g., hydrolysis of ammonium bromide, does not effect the reduction of bromine.

Moreover, it is now shown that the thermic effect of bromine reduction by means of ammonium salts of weak and intermediate acids is by far smaller than the thermic effect of bromine reduction by gaseous ammonia. This is essential to the invention because it becomes possible thereby to perform the synthesis with the great speed without the risk of local superheating, without the necessity of fast cooling, and mainly, without fear of explosive reaction.

It is particularly useful to use in the process according to the invention ammonium salts of such weak or intermediate acids which readily decompose or undergo the oxidation into gaseous substances. As such are considered, e.g. carbonic acid, carbamic acid, oxalic acid and the like.

This, however, does not restrict the range of application of the invention.

The separation of ammonium bromide from the free acid resulting from reaction 4 can be performed by other known processes particularly by distillation-off acid, or by means of crystallization and the like technological methods.

The recovered acid can be converted into the form of an ammonium salt and reused in the production again.

The process according to the invention is valuable in many respects. Besides the above mentioned security and minimal thermic effect, it is marked by low expenses of raw materials and high yield of the primary material. By use of materials of the proper purity there are obtained, without any additional technological measures, products

Example 1

To a solution of 75 kg. of ammonium bicarbonate in 120 l. of water there are introduced over 1 hour 52 kg. of bromine, while the temperature is maintained at 30–35° C. The introduction of bromine is terminated after the solution starts to be straw-colored. The gases resulting from the reaction are removed into a washer filled with 120 l. of water containing 16.5 kg. of ammonia. The obtained solution of ammonium carbonate is used as the next production charge instead of ammonium bicarbonate solution.

Considering the amount of bromine absorbed in the washer and returned to the process, the efficiency based on bromine is stoichiometric.

Example 2

To a solution of 35.2 kg. of ammonium carbamate in 120 l. of water there are introduced over 1 hour 54 kg. of bromine, while the temperature is maintained at about 30° C. The introduction of bromine is terminated when the solution turns potassium iodide starch paper a pale blue color. The gases resulting from the reaction are removed to a washer filled with 120 l. of water, containing 35.2 kg. of ammonium carbamate. The contents of the washer are used in the following cycle of production.

The overall efficiency of bromine is stoichiometric.

I claim:

1. A process for producing ammonium bromide comprising reacting, at a temperature of about 30°–35° C. ammonia and bromine in the presence of water and a reducing agent which is ammonium salt of a weak or intermediate acid, said acid being one which will readily decompose or be oxidized into gaseous substances.

2. A process as claimed in claim 1 wherein the weak or intermediate acid is a member of the group consisting of carbonic acid, carbamic acid and oxalic acid.

References Cited

UNITED STATES PATENTS

| | | | |
|---|---|---|---|
| 1,292,016 | 1/1919 | Murrell | 23—100 |
| 1,919,943 | 7/1933 | Heath et al. | 23—100 |
| 1,987,572 | 1/1935 | Heath | 23—100 |

OTHER REFERENCES

H. Remy's book, "Treatise on Inorganic Chem., vol. 1, 1956 ed., page 796. Elsevier Pub. Co., New York.

EDWARD STERN, Primary Examiner

U.S. Cl. X.R.

23—220